(12) United States Patent
Tamaoka

(10) Patent No.: US 7,514,831 B2  
(45) Date of Patent: Apr. 7, 2009

(54) MOTOR HAVING FLUID DYNAMIC BEARING AND DISK DRIVE WITH THE-LIKE MOTOR

(75) Inventor: Takehito Tamaoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 453 days.

(21) Appl. No.: 11/428,843

(22) Filed: Jul. 6, 2006

(65) Prior Publication Data

US 2007/0007841 A1 Jan. 11, 2007

(30) Foreign Application Priority Data

Jul. 6, 2005 (JP) ............................ 2005-198181  
May 26, 2006 (JP) ............................ 2006-146339

(51) Int. Cl.  
*H02K 7/08* (2006.01)  
*H02K 5/16* (2006.01)  
*G11B 17/00* (2006.01)

(52) U.S. Cl. .................... 310/90; 310/67 R; 360/99.07; 360/99.08

(58) Field of Classification Search ............... 310/67 R, 310/90; 360/99.07–99.08; 384/100, 107–124, 384/286–287, 291–292, 279  
See application file for complete search history.

(56) References Cited

U.S. PATENT DOCUMENTS

| | | | | | |
|---|---|---|---|---|---|
| 5,103,335 | A | * | 4/1992 | Sugiura | 359/212 |
| 5,746,516 | A | * | 5/1998 | Miyasaka et al. | 384/291 |
| 5,932,946 | A | * | 8/1999 | Miyasaka et al. | 310/90.5 |
| 6,276,831 | B1 | * | 8/2001 | Takahashi et al. | 384/100 |
| 6,357,920 | B1 | * | 3/2002 | Mori et al. | 384/279 |

FOREIGN PATENT DOCUMENTS

JP H09-117094 A 5/1997

* cited by examiner

*Primary Examiner*—Tran N Nguyen  
(74) *Attorney, Agent, or Firm*—Volentine & Whitt, PLLC

(57) ABSTRACT

Motor having a rotor magnet, a stator and a bearing mechanism with vibrations and noises suppressed. The greatest common divisor of the number of the magnetic poles of the rotor magnet and the number of the teeth of the stator is larger than the number of drive phases for the stator. Further, the number of the radial dynamic pressure generation grooves or the thrust dynamic pressure generation grooves coincides with none of the divisors and multiples of the number of the magnetic poles of the rotor magnet and the number of the teeth of the stator.

17 Claims, 18 Drawing Sheets

MOTOR HAVING FLUID DYNAMIC BEARING AND DISK DRIVE WITH THE-LIKE MOTOR

BACKGROUND OF THE INVENTION

1. Technical Field

This invention relates to a motor having a fluid dynamic bearing and a disk drive for rotating a recording disk using the motor.

2. Description of the Related Art

In recent years, the storage capacity of the recording disk drive including the hard disk drive has remarkably increased while the size thereof has been decreased. With the increase in storage capacity, the motor (spindle motor) used with the recording disk drive to rotate the recording disk is required to be further increased in rotation accuracy and decreased in size. Further, the recording disk drive mounted on a portable device is liable to be exposed to external vibrations and, as compared with the conventional motor, required to remarkably reduce the RRO (repeatable run out: the displacement of the synchronous component of the rotor of the motor in operation) and the pure tone (the pure tone noise generated by resonance of vibration of motor) generated by resonance. In view of this, the motor in this field employs a bearing using a fluid dynamic pressure to improve the quietude and the rotation accuracy. For example, a fluid dynamic bearing having a plurality of grooves is known. The number of the grooves is considered to be preferably a multiple of three from the viewpoint of the accuracy of fabrication jigs and symmetry, and 3, 6, 9 or 12 grooves are employed in actual applications.

On the other hand, a DC brushless motor is used as a spindle motor. This DC brushless motor includes, for example, a rotor magnet having a plurality of diametrically magnetized poles and a stator having a plurality of teeth (magnetic pole teeth) arranged in diametrically opposed relation to the rotor magnet. In order to secure a high duty factor, the stator coil is excited by a three-phase voltage applied thereto. For the purpose of reducing vibrations, noises and cogging, a DC brushless motor is known in which the rotor magnet has 8 poles and the stator has 6 teeth with 3, 5, 7 or 11 grooves of the fluid dynamic bearing. Depending on the number of the poles and slots of the motor actually selected, however, vibrations are often caused regardless of the number of the grooves. Also, even for the number of the grooves which is considered to hardly cause vibrations, the synergy superimposition resonance of vibrations of the motor and the bearing causes large vibrations.

BRIEF SUMMARY OF THE INVENTION

This invention has been developed in view of the problem described above. Specifically, the object of this invention is to provide an electric motor having a bearing mechanism utilizing the fluid dynamic pressure, in which the synergy superimposition resonance is suppressed caused by the mechanical vibrations including the natural frequency or the excitation frequency unique to the bearing and what is called the electromagnetic vibrations due to the electromagnetic excitation power of the motor derived from the order or an integer multiple thereof coincident with the number of poles or slots (teeth) of the field magnet or the component of the order of the inverse integer ratio (i.e. the component of the order constituting a divisor).

A motor according to the invention intended to solve the problem described above includes a rotary unit and a stationary member. A rotor magnet having poles in the number P is mounted on the rotary unit. The stationary member has mounted thereon a stator having teeth in the number S of which the greatest common divisor with the number P of the magnetic poles is not less than the number of drive phases, and each tooth is wound with a coil. The rotary unit and the stationary member are arranged in opposed relation to each other with a minuscule gap therebetween in which a lubricating fluid is held. At least one of the opposed surfaces of the rotary unit and the stationary member making up the minuscule gap therebetween is formed with C dynamic pressure generation grooves. The number C is assumed to satisfy the relations $iP \ne C$, $P/j \ne C$, $mS \ne C$, and $S/n \ne C$ (i, j, m, n: arbitrary natural numbers) where P is the number of poles and S the number of teeth.

The electromagnetic vibrations are experimentally known to be generated in various orders. It is also experimentally and theoretically confirmed that the electromagnetic vibrations are liable to occur with the order constituting a multiple or a divisor of the number of poles or teeth. It is also confirmed that the order to generate the electromagnetic vibrations is small in the case where the number of poles and the number of teeth have a common divisor. Especially in the case where the greatest common divisor is larger than the number of drive phases of the motor, the order generating the electromagnetic vibrations is small.

As long as the number of the dynamic pressure generation grooves of the fluid dynamic bearing is not coincident with the order described above, therefore, the electromagnetic vibrations and the mechanical vibrations have different frequencies and the resonance can be suppressed.

By embodying this invention, the frequency of the electromagnetic vibrations and the frequency of the mechanical vibrations of the bearing fail to coincide and the resonance is generated less frequently. In other words, according to this invention, there is provided a motor and a recording disk drive reduced in both vibrations and noises.

The above and other objects and effects of the invention will be made apparent from the detailed description below.

DETAILED DESCRIPTION OF THE INVENTION

Best Mode for Carrying Out the Invention

Embodiments of the invention are explained below with reference to the drawings. In the description of the embodiments, the words and phrases used to indicate any of vertical and horizontal directions represent those on the drawings unless otherwise specified and are not intended to limit the actual directions.

FIRST EMBODIMENT

Figure 1:
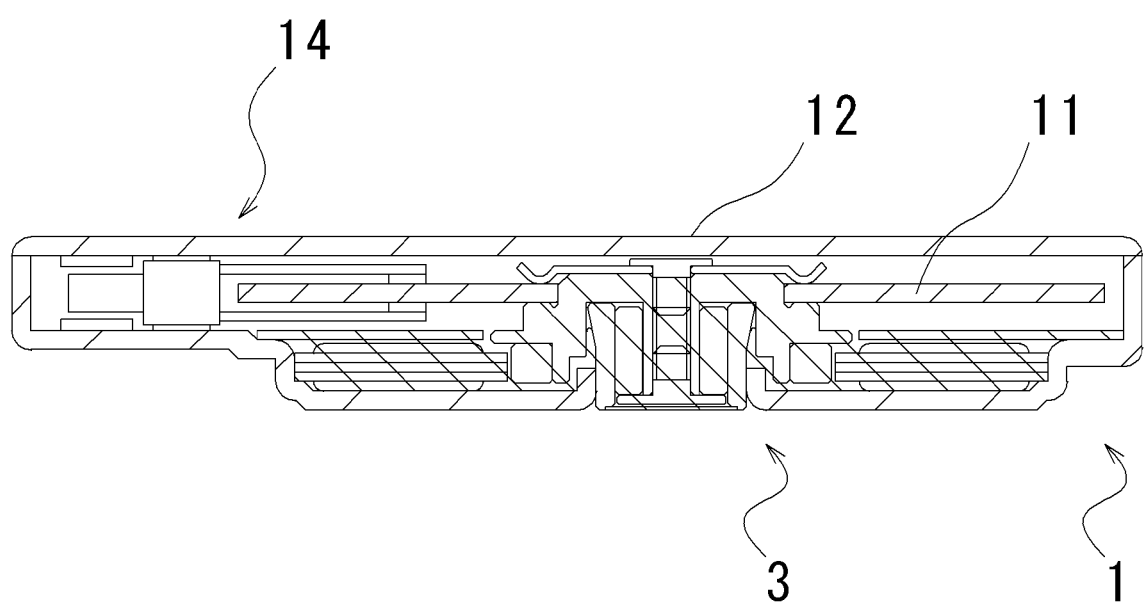
FIG. 1 is a sectional view schematically showing a recording disk drive according to a first embodiment of the invention.

FIG. 1 is a sectional view schematically showing a configuration of a hard disk drive according to a first embodiment of the invention. A hard disk drive 1 constituting a recording disk drive includes a spindle motor 3, a hard disk 11 which is mounted on the rotary unit of the spindle motor 3 and into which information is written, an access unit 14 for writing and reading information into and from the hard disk 11 and a housing 12 for accommodating the aforementioned members therein.

Figure 2:
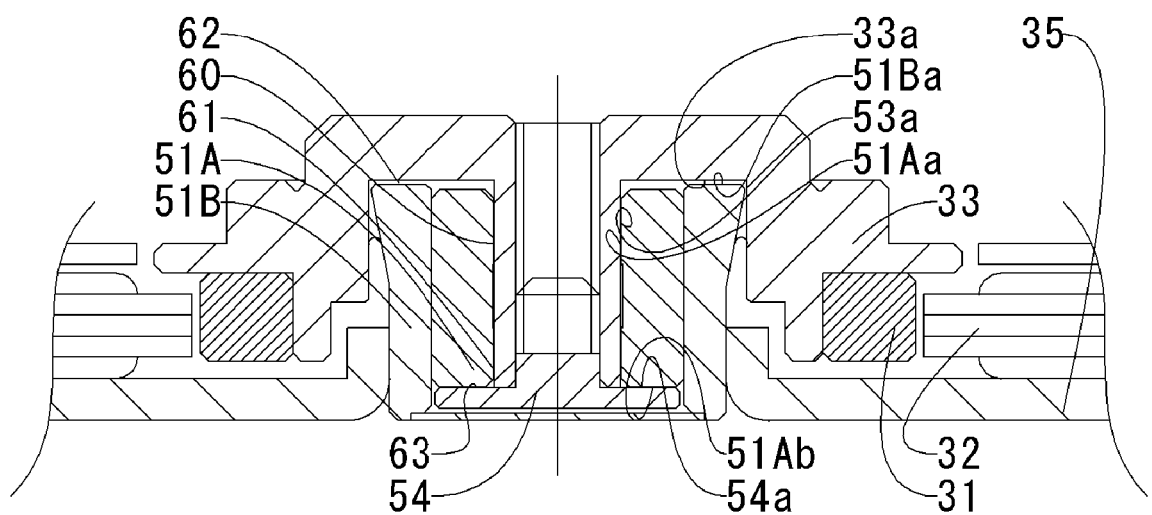
FIG. 2 is a sectional view schematically showing a spindle motor according to the first embodiment of the invention.

FIG. 2 is a sectional view schematically showing the spindle motor 3 used with the hard disk drive 1 according to the first embodiment. The spindle motor 3 includes a rotor hub 33 having a disk mounting surface 33 on which to mount the hard disk 11, a rotor magnet 31 mounted on the rotor hub 33, a base 35 and a stator 32 mounted on the base 35 in diametrically opposed relation to the rotor magnet 31. The rotor hub 33 and the rotor magnet 31 make up a rotary unit 3a, while the base 35 and the stator 32 make up a stationary member 3b. The spindle motor 3 further includes a bearing mechanism 50 for supporting the rotary unit 3a rotatably on the stationary member 3b.

The bearing mechanism 50 includes a shaft 53 erected at the rotation center of and adapted to rotate integrally with the rotor hub 33, a sleeve 51A with the shaft 53 inserted thereinto and a substantially cylindrical bearing housing 51B mounted on the base 35 to cover the outer periphery of the sleeve 51A.

The sleeve 51A is a sintered porous metal member formed by sintering metal powder. In forming the sleeve of a sintered porous metal, dynamic pressure generation grooves (or hills) are formed in press at the time of sizing after molding in a die. Through this process, the sleeve may be deformed to reduce the roundness thereof at the time of forming the grooves. According to this invention, the synergy superimposition resonance of mechanical vibrations and electromagnetic vibrations which otherwise might be caused by this deformation can be avoided, and both the mass productivity and the production cost are improved.

A thrust plate 54 having a flat surface perpendicular to the rotary axis of the spindle motor 3 is mounted at a lower end portion 53b of the shaft. The outer peripheral surface 53a of the shaft and the inner peripheral surface 51Aa of the sleeve are arranged in opposed relation to each other diametrically through a minuscule gap as small as several to ten and several μm therebetween. The upper end surface 51Ba of the bearing housing and the lower surface 33a of the rotor hub are arranged in opposed relation to each other axially through a minuscule gap as small as several to several tens of μm therebetween. The lower end surface 51Ab of the sleeve and the upper surface of the thrust plate 54 are arranged in opposed relation to each other axially through a minuscule gap as small as several to several tens of μm.

A lubricating fluid 57 is held in these diametrical and axial minuscule gaps. With the rotation of the rotary unit 3a with respect to the stationary member 3b, radial fluid dynamic bearings 60, 61 are formed by the dynamic pressure generated by the lubricating fluid 57 held in the diametrical minuscule gap. Also, thrust fluid dynamic bearings 62, 63 are formed at two points by the dynamic pressure generated by the lubricating fluid 57 held in the two axial minuscule gaps. Of these two thrust fluid dynamic bearings 62, 63, the thrust fluid dynamic bearing formed between the upper end surface 51Ba of the bearing housing and the lower end surface of the rotor hub 33 is called an upper thrust fluid dynamic bearing 62, while the thrust fluid dynamic bearing formed between the lower end surface 51Ab of the sleeve and the upper surface 54a of the thrust plate is called a lower thrust fluid dynamic bearing 63. The upper thrust fluid dynamic bearing 62 sets the rotary unit 3a afloat upward of the stationary member 3b, while the lower thrust fluid dynamic bearing 63 sets the rotary unit 3a afloat downward of the stationary member 3b.

The upward floating force of the upper thrust fluid dynamic bearing 62 is larger than the downward floating force of the lower thrust fluid dynamic bearing 63. To offset this imbalance between the floating forces, the axial center of the rotor magnet 31 is arranged slightly above the axial center of the stator 32, and a magnetic back pressure is imparted to the rotary unit 3a to pull the rotor magnet 31 downward.

The inner peripheral surface 51Aa of the sleeve is formed with radial dynamic pressure generation grooves 60a, 61a in the shape of herring bone. A spiral or herring bone-shaped upper thrust dynamic pressure generating groove 62a is formed on the upper end surface 51Ba of the bearing housing making up the upper thrust fluid dynamic bearing 62. Also, a spiral or herring bone-shaped lower thrust dynamic pressure generating groove 51Bb is formed on the lower end surface 51Ab of the sleeve making up the lower thrust fluid dynamic bearing 63. A high dynamic pressure is generated by the pumping effect of the radial and thrust dynamic pressure generation grooves, so that the bearing rigidity of the fluid dynamic bearings is increased. The detailed specification of the dynamic pressure generation grooves is explained later.

The spindle motor 3 is a three-phase DC brushless motor. The number of the teeth 32a of the stator 32 is 3 or a positive integer multiple thereof. A plurality of diametrically magnetized magnetic poles 31a of the rotor magnet 31 are arranged along the peripheral direction thereof.

Figure 5A:
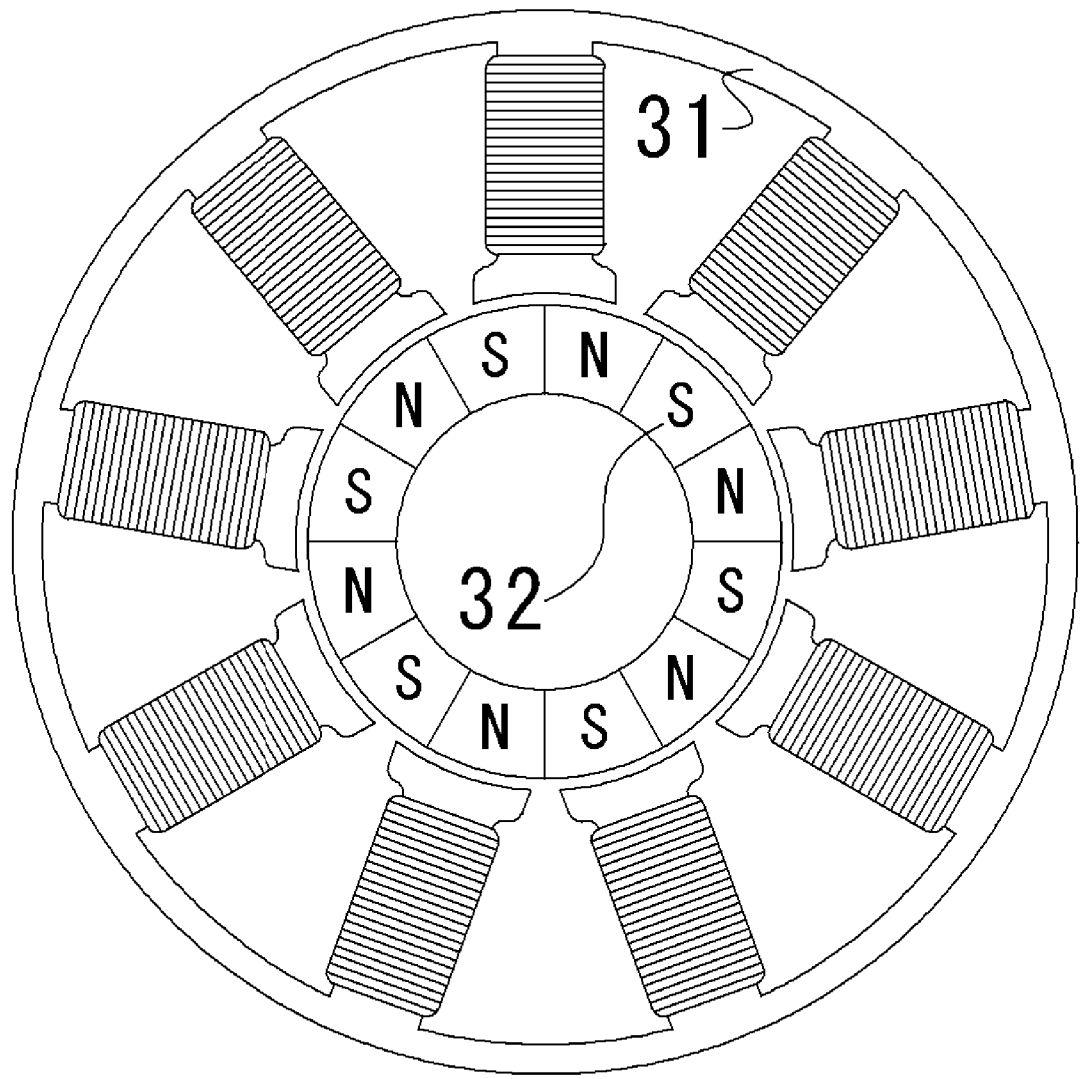
FIG. 5A is a diagram schematically showing the magnetic poles of the rotor magnet and the teeth of the stator according to the first embodiment of the invention.

FIG. 5A shows a layout of the poles 31a of the rotor magnet 31 and the teeth of the stator 32 of the spindle motor 3 according to this embodiment. In FIG. 5A, the rotor magnet 31 is defined into portions designated by N and S which indicate that the rotor magnet 31 is diametrically magnetized in such a manner that the N or S poles appear on the surface diametrically opposed to the stator. According to this embodiment, the rotor magnet 31 has 12 poles (magnetic poles) and the stator 32 has 9 teeth. In this case, the greatest common divisor of the number of the poles and the number of the teeth is 3 which is identical with the number of drive phases of the spindle motor 3. Also, the fundamental frequency of electromagnetic vibrations is the order 36, i.e. the least common multiple of the number of the poles and the number of the teeth. The fundamental frequency is also the order of switching and the minimum order at which the motor torque rises and falls. Therefore, vibrations are liable to be caused by the frequencies in the neighborhood of this order and integer multiples thereof.

Experiences and a simulation result substantiate the fact that a motor in which the greatest common divisor of the number of poles (magnetic poles) and the number of teeth (slots) is larger than the number of phases, as compared with a motor with the greatest common divisor smaller than the number of phases and having, for example, a set of eight poles and nine slots (greatest common divisor: 1) or a set of eight poles and six slots (greatest common divisor: 2), has a smaller order causing vibrations including diametrical and axial vibrations and peripheral cogging on the one hand and a smaller amplitude on the other hand.

In the order coincident with the number of poles or slots (teeth) of the field magnet or the order equal to an integer multiple thereof, the symmetry of the motor rotation is disturbed and therefore vibrations are liable to occur. Further, in the case where the vibrations in this frequency band generate the vibration of the component of the order of the inverse integer ratio (i.e. the component of the order constituting a divisor) and the frequency of the vibration matches to the natural frequency of the spindle motor, the mechanical resonance may be caused. Therefore, such a situation is required to be avoided. In view of this, according to this invention, the number C of the dynamic pressure generation grooves is set to satisfy the relations iP≠C, P/j≠C, mS≠C, and S/n≠C (i, j, m, n: arbitrary natural numbers) for the number P of poles and the number S of teeth.

A high roundness is required of every member making up the radial fluid dynamic bearing. Especially in the case where the grooves are formed by press, coining or rolling, the stress causes the deformation and may reduce the roundness. The use of the number of grooves according to the invention, however, can prevent the resonance even with the reduction in roundness.

Figure 6A:
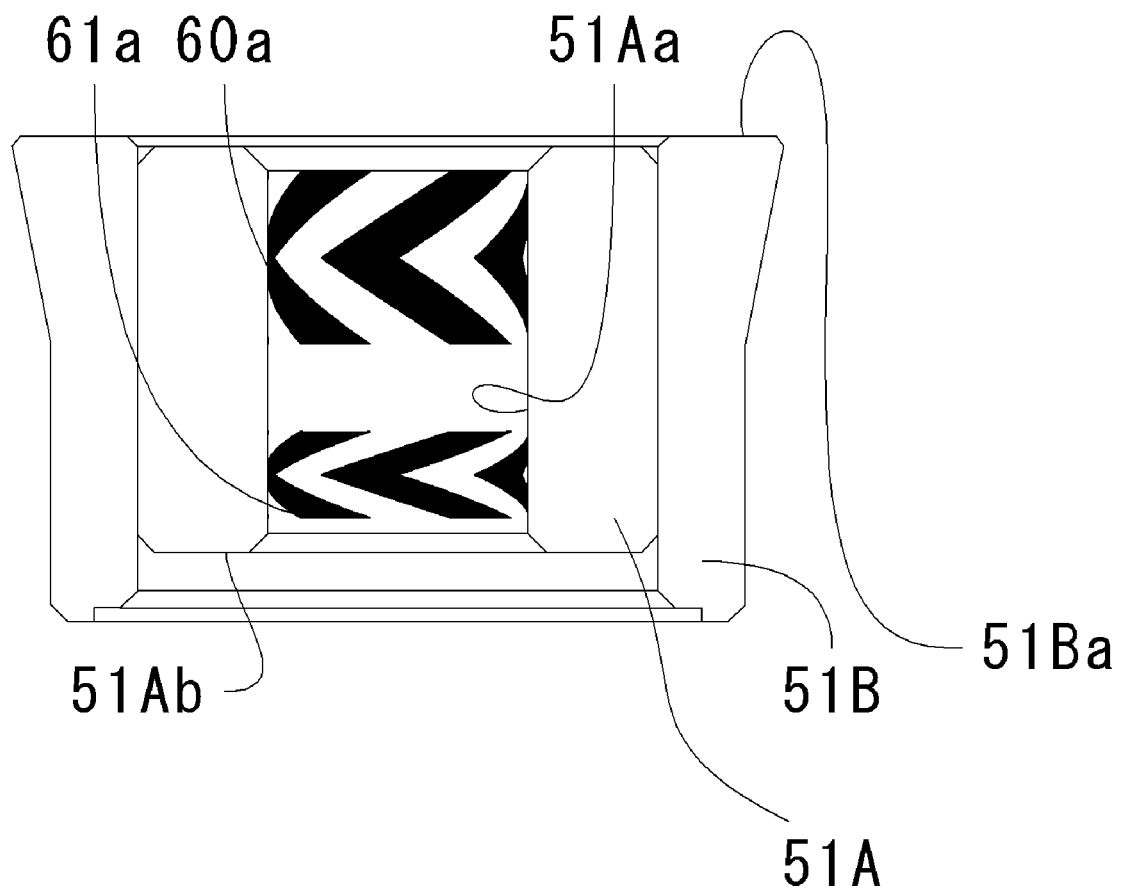
FIG. 6A is a sectional view showing the sleeve of the spindle motor and the bearing housing according to the first embodiment of the invention.
Figure 6B:
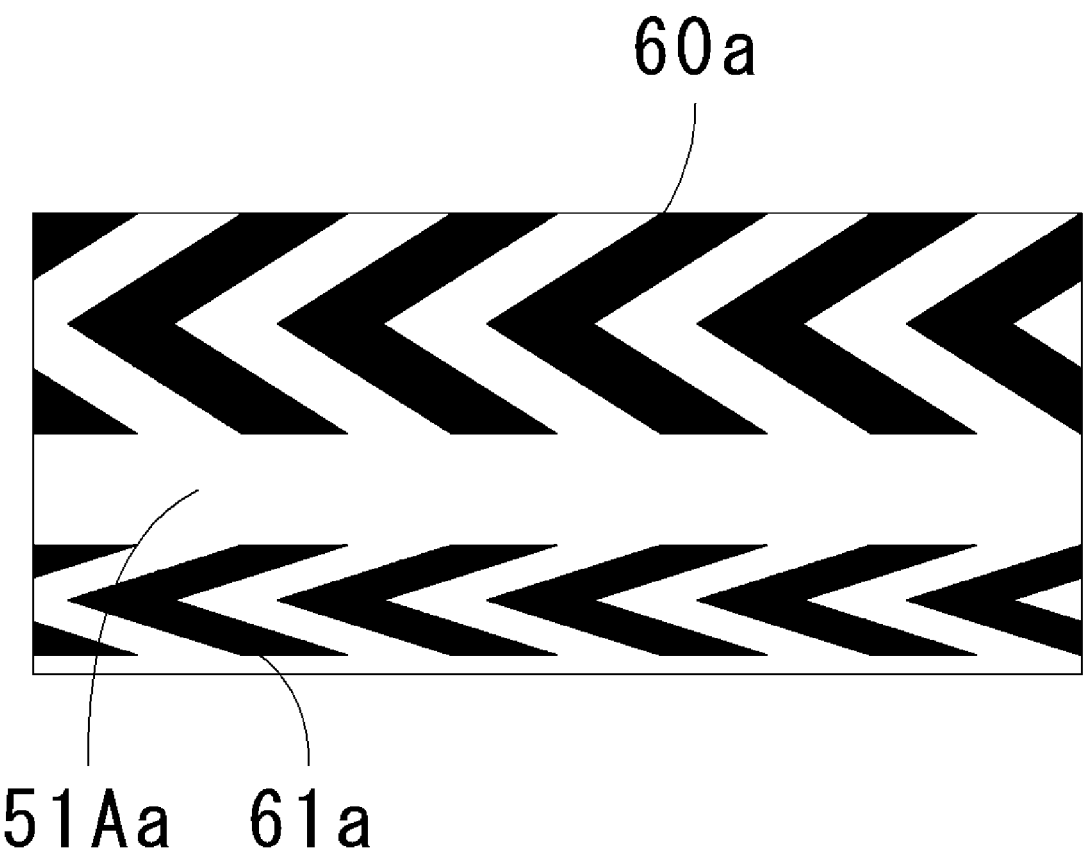
FIG. 6B is a development of the inner peripheral surface of the sleeve of the spindle motor according to the first embodiment of the invention.
Figure 6C:
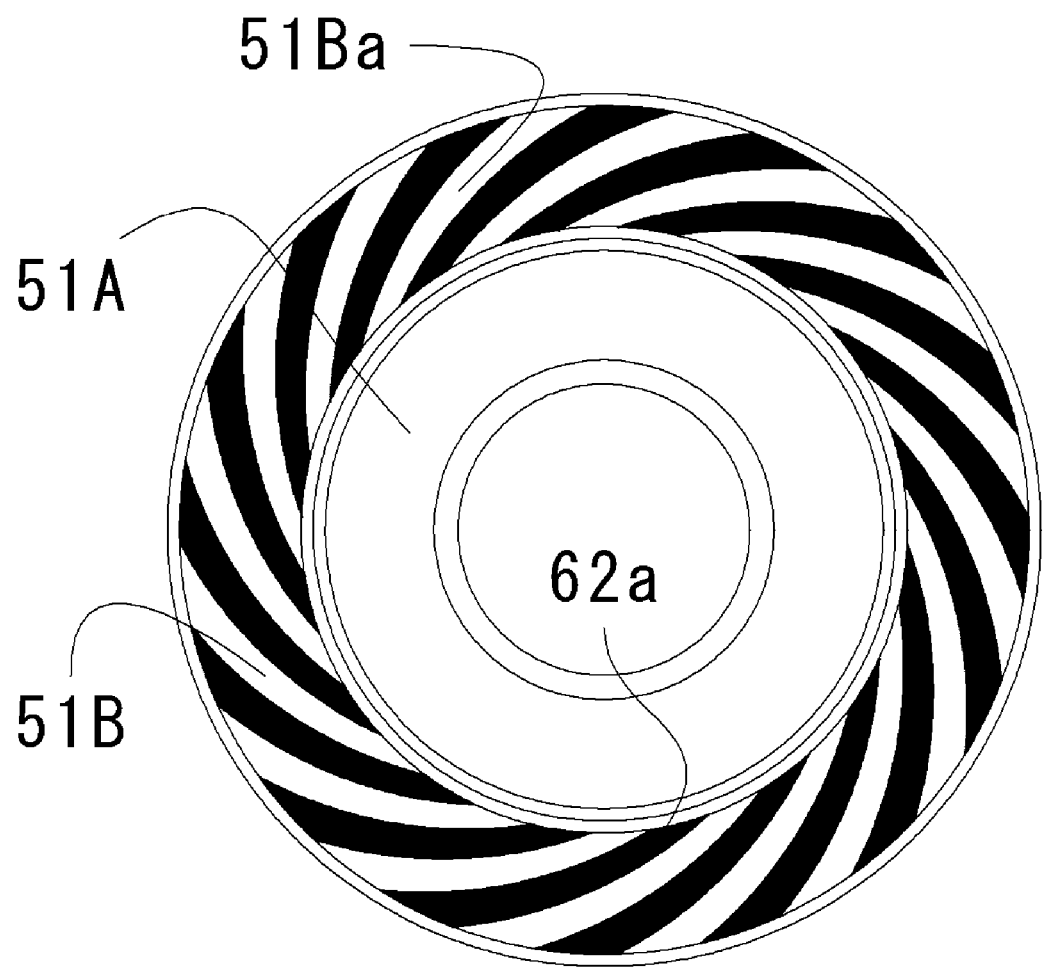
FIG. 6C is a plan view taken from the upper side of the sleeve and the bearing housing of the spindle motor according to the first embodiment of the invention.
Figure 6D:
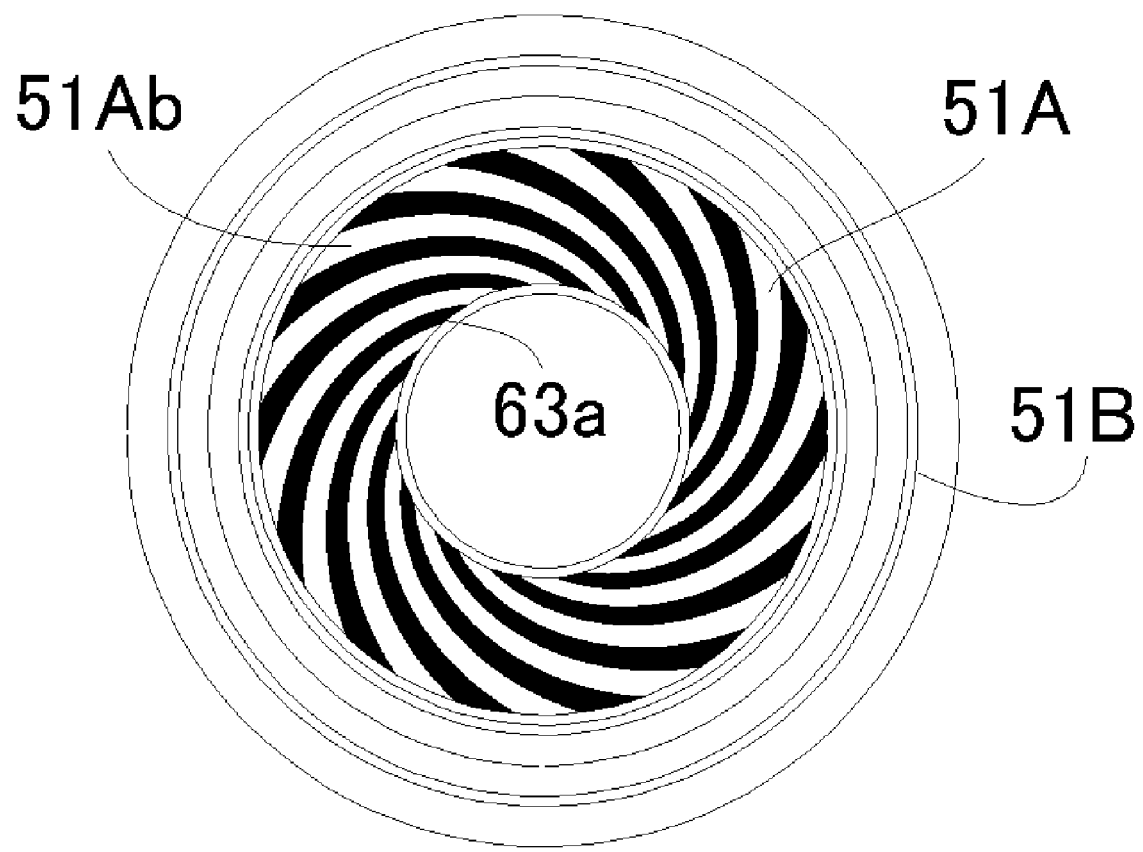
FIG. 6D is a plan view taken from the lower side of the sleeve and the bearing housing of the spindle motor according to the first embodiment of the invention.

FIG. 6A is a sectional view showing the sleeve 51A and the bearing housing 51B according to this embodiment, FIG. 6B is a development of the inner peripheral surface 51Aa of the sleeve, FIG. 6C is a plan view taken from the upper side of the sleeve 51A and the bearing housing 51B including the upper end surface 51Ba of the bearing housing, and FIG. 6D is a plan view taken from the lower side of the sleeve 51A and the bearing housing 51B including the lower end surface 51Ab of the sleeve. This embodiment includes 5 radial dynamic pressure generation grooves 60a, 61 a, 16 upper thrust dynamic pressure generation grooves 62a and 14 lower thrust dynamic pressure generation grooves 63. The reason for selecting these numbers of grooves is explained below. In FIGS. 6A to 6D, the edge portion, etc. and the hatch indicating a cross section are not shown to clarify the shape of the groove pattern. The solid black portions are the grooves which are depressed relatively to the surrounding portions.

The number of the radial dynamic pressure generation grooves 60a, 61a is determined by the inner diameter of the sleeve 51A, the width and machining accuracy of the grooves, the magnitude of the desired dynamic pressure and the viscosity and density of the lubricating fluid. For the spindle motor for rotating a small-diameter recording disk of not more than 1.0 inch, for example, the diameter of the shaft 53 is about 1.5 to 2.5 mm, and taking the width of the grooves required to be machined into consideration, about 3 to 12 grooves are feasible. According to this invention, 12 poles and 9 teeth are used, and therefore 3, 4, 6, 9, 12 which are divisors or multiples thereof are eliminated. Thus, the suitable number of the radial dynamic pressure generation grooves 60a, 61a is 5, 7, 8, 10 or 11.

The number of the thrust dynamic pressure generation grooves 62 is determined by the area of the portion formed with the grooves, the width and machining accuracy of the grooves, the desired magnitude of the dynamic pressure and the viscosity and density of the lubricating fluid.

In the case of the upper thrust fluid dynamic bearing 62, the diameter of the outer periphery of the portion formed with the upper thrust dynamic pressure generation grooves 62a is 3.5 to 6.5 mm, and taking the machinable groove width into consideration, the feasible number of the grooves is about 3 to 20. According to this invention, the numbers 3, 4, 6, 9, 12 and 18 are eliminated. The suitable number of the upper dynamic pressure generation grooves 62a, therefore, is 5, 7, 8, 10, 11, 13, 14, 15, 16, 17, 19 or 20. Especially, the number of the upper thrust dynamic pressure generation grooves 62a, often larger than the number of the radial dynamic pressure generation grooves 60a, 61a, is suitably not less than 10.

In the case of the lower thrust fluid dynamic bearing 63, the diameter of the outer periphery of the portion formed with the lower thrust dynamic pressure generation grooves 63a is 4 to 7 mm, and the numbers of about 3 to 20 are feasible. According to this invention, therefore, the suitable number of the lower thrust dynamic pressure generation grooves 63a is 5, 7, 8, 10, 11, 13, 14, 15, 16 or 17. Especially, like the upper thrust dynamic pressure generation grooves 62a, the number of not less than 8 is suitable.

This invention is desirably applicable especially to a recording disk drive requiring a high rotation accuracy and quietude. By embodying this invention, the data read/write error is caused less often even with an improved recording density. Further, the noises attributable to such vibrations are prevented.

SECOND EMBODIMENT

Figure 3:
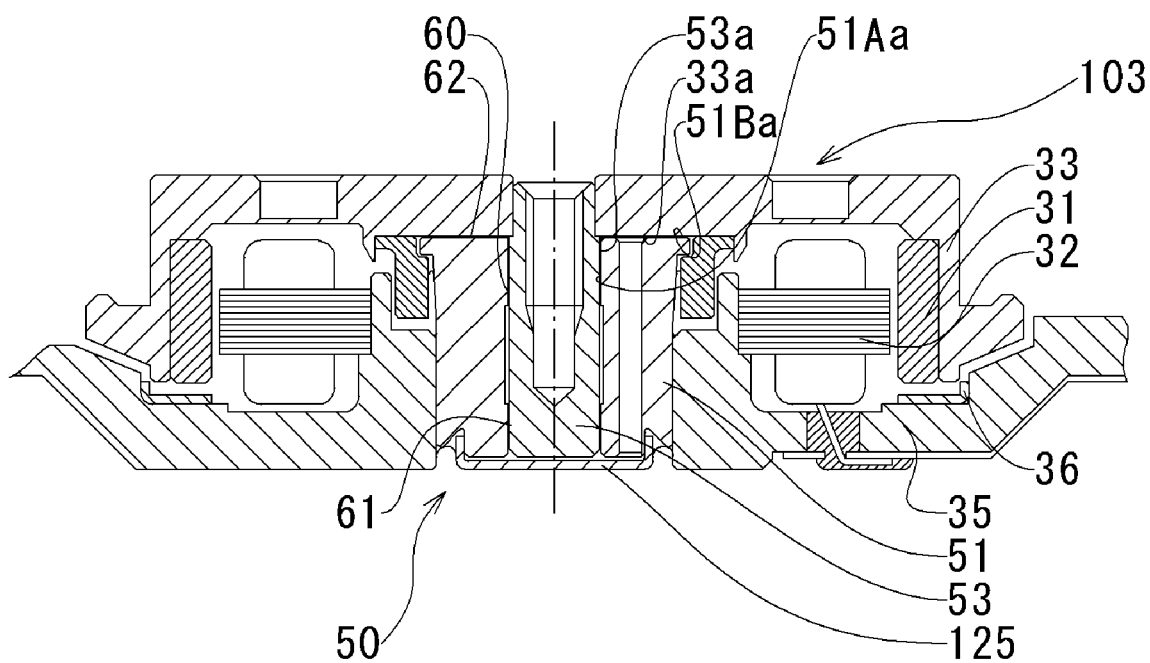
FIG. 3 is a sectional view schematically showing a spindle motor according to a second embodiment of the invention.

FIG. 3 is a sectional view schematically showing a spindle motor 103 according to a second embodiment. In this embodiment, the members having the same or similar functions as or to those of the first embodiment, even though different in form with those of the first embodiment, are designated by the same names or reference numerals, respectively.

The spindle motor 103 according to this embodiment, like the first embodiment, includes a rotor hub 33, a rotor magnet 31, a base 35, a stator 32 and a bearing mechanism 50.

The bearing mechanism 50 includes a shaft 53 erected at the rotation center of and adapted to be rotated integrally with the rotor hub 33, and a sleeve 51 into which the shaft 53 is inserted. The sleeve 51 is mounted on the base 35. The outer peripheral surface 53a of the shaft and the inner peripheral surface 51Aa of the sleeve are arranged in opposed relation to each other diametrically with a minuscule gap of several to ten and several μm therebetween. The upper end surface 51Ba of the sleeve and the lower surface 33a of the rotor hub 1 are arranged in opposed relation to each other axially with a minuscule gap of several to several tens of μm therebetween.

A lubricating fluid 57 is held in these diametrical and axial minuscule gaps. With the rotation of the rotary unit 3a with respect to the stationary member 3b, radial fluid dynamic bearings 60, 61 are formed by the dynamic pressure generated by the lubricating fluid 57 held in the diametrical minuscule gap. Also, a thrust fluid dynamic bearing 62 is formed by the dynamic pressure generated by the lubricating fluid 57 held in the axial minuscule gap.

In this bearing mechanism 50, the thrust fluid dynamic bearing 62 sets the rotary unit 3a afloat upward of the stationary member 3b. Under this condition, however, only the rotary unit 3a is afloat, and the axial supporting force may be unstablized. For this reason, a ferromagnetic thrust yoke 36 is mounted on the portion of the base 35 in opposed relation to the lower end portion of the rotor magnet 31, and a magnetic back pressure is imparted to the rotor unit 3a to pull the rotor magnet 31 downward. In the case where the magnetic back pressure is applied using the rotor magnet as in the first embodiment, vibrations may be caused due to irregular magnetization of the rotor magnet. Application of the magnetic back pressure by the ferromagnetic thrust yoke 36 causes the resonance less often between the vibration attributable to the magnetic attraction and the bearing members.

The radial dynamic pressure generation grooves 60a, 61a in the shape of herring bone are formed on the inner peripheral surface 51Aa of the sleeve. The spiral or herring bone-shaped thrust dynamic pressure generation grooves 62a is formed on the upper end surface 51Ba of the sleeve. A high dynamic pressure is generated by the pumping effect of the radial dynamic pressure generation grooves 60a, 61a and the thrust dynamic pressure generation grooves 62a, thereby improving the bearing rigidity of the fluid dynamic bearing. The detailed specification of the dynamic pressure generation grooves is explained later.

The spindle motor 103 is a three-phase DC brushless motor. The number of the teeth 32a of the stator 32 is 3 or a positive integer multiple thereof. A plurality of diametrically magnetized magnetic poles 31a are arranged along the peripheral direction on the rotor magnet 31.

Figure 5B:
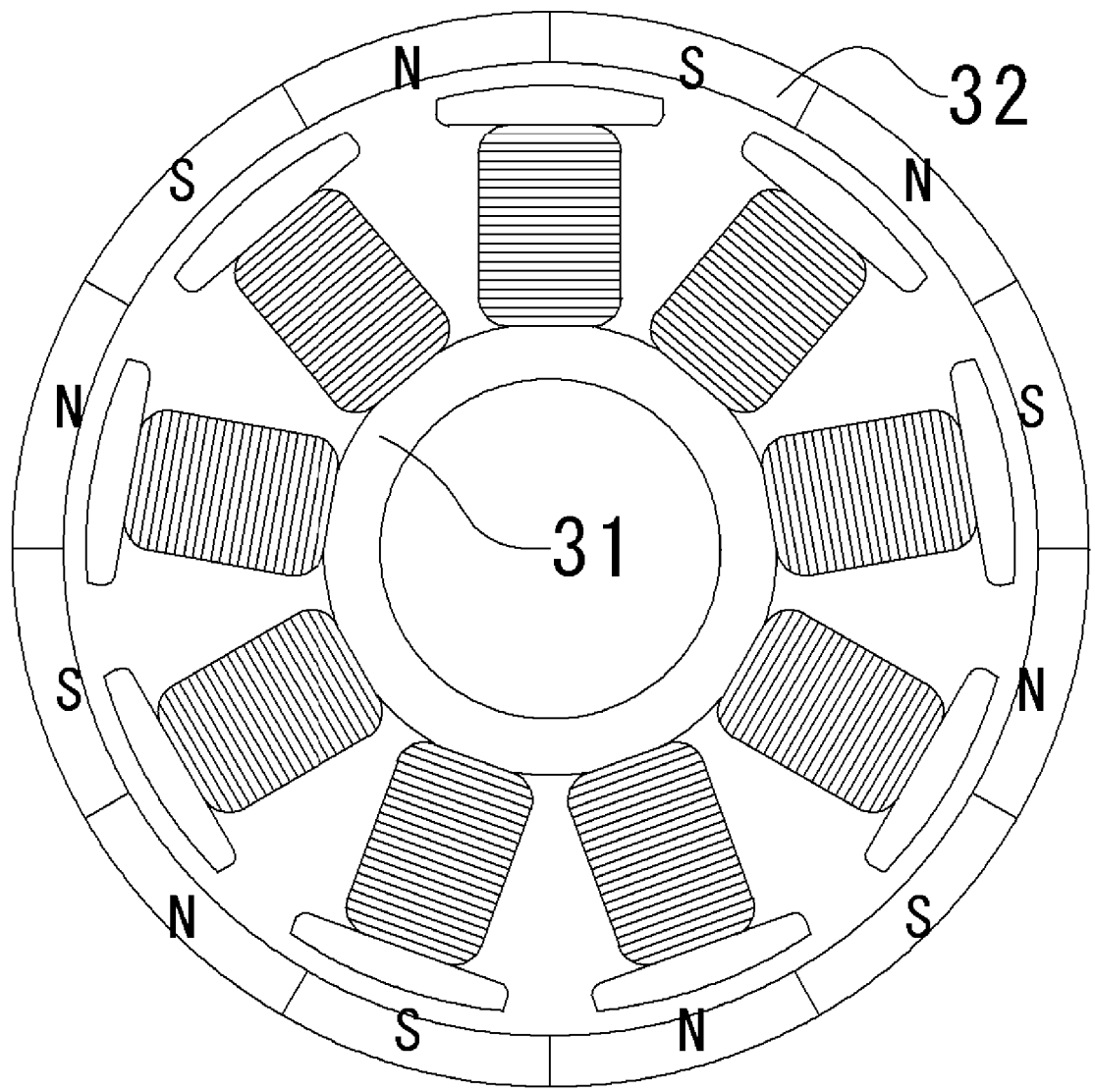
FIG. 5B is a diagram schematically showing the magnetic poles of the rotor magnet and the teeth of the stator according to the second embodiment of the invention.

FIG. 5B shows a layout of the poles 31a of the rotor magnet 31 and the teeth of the stator 32 of the spindle motor 203 according to this embodiment. In FIG. 5B, the rotor magnet 31 is defined into portions designated by N and S indicating that the rotor magnet 31 is diametrically magnetized in such a manner that the N or S poles appear on the surface diametrically opposed to the stator. According to this embodiment, like in the first embodiment, the rotor magnet 31 have 12 poles and the stator 32 has 9 teeth.

Figure 7A:
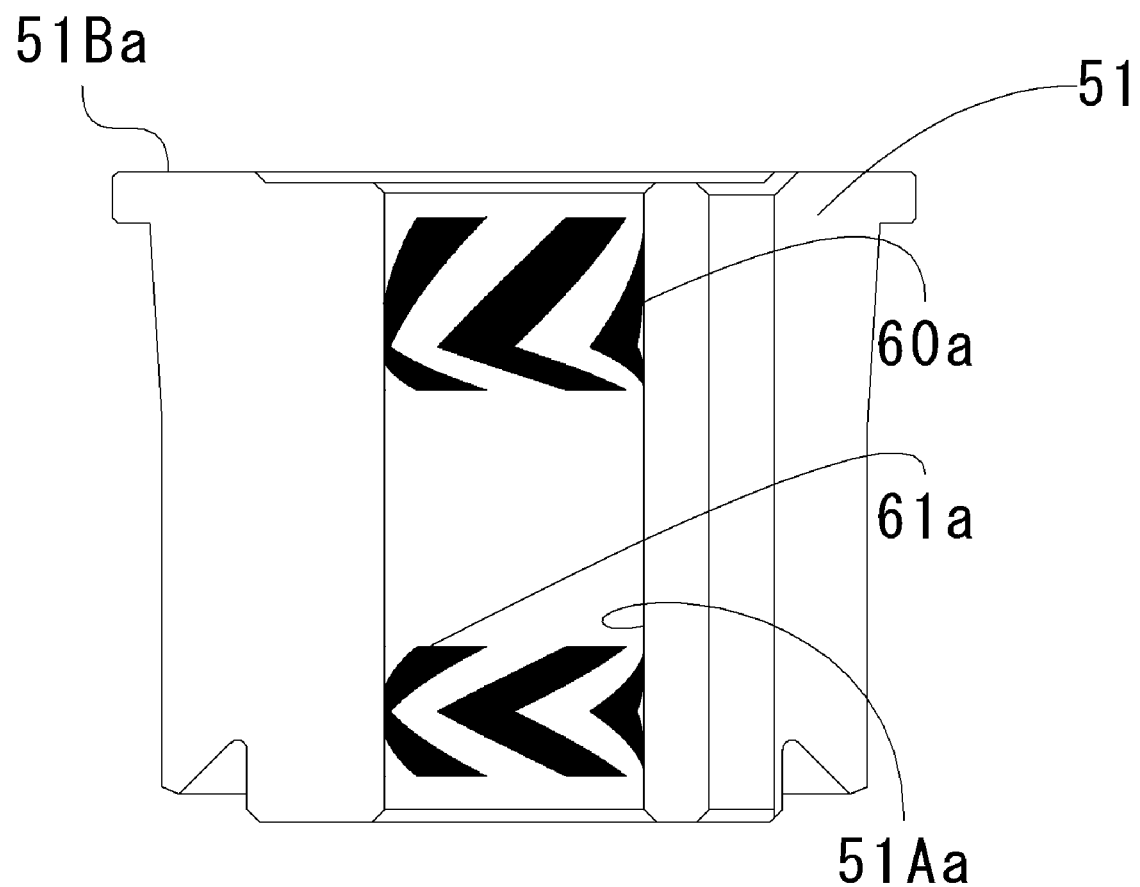
FIG. 7A is a sectional view showing the sleeve of the spindle motor according to the second embodiment of the invention.
Figure 7B:
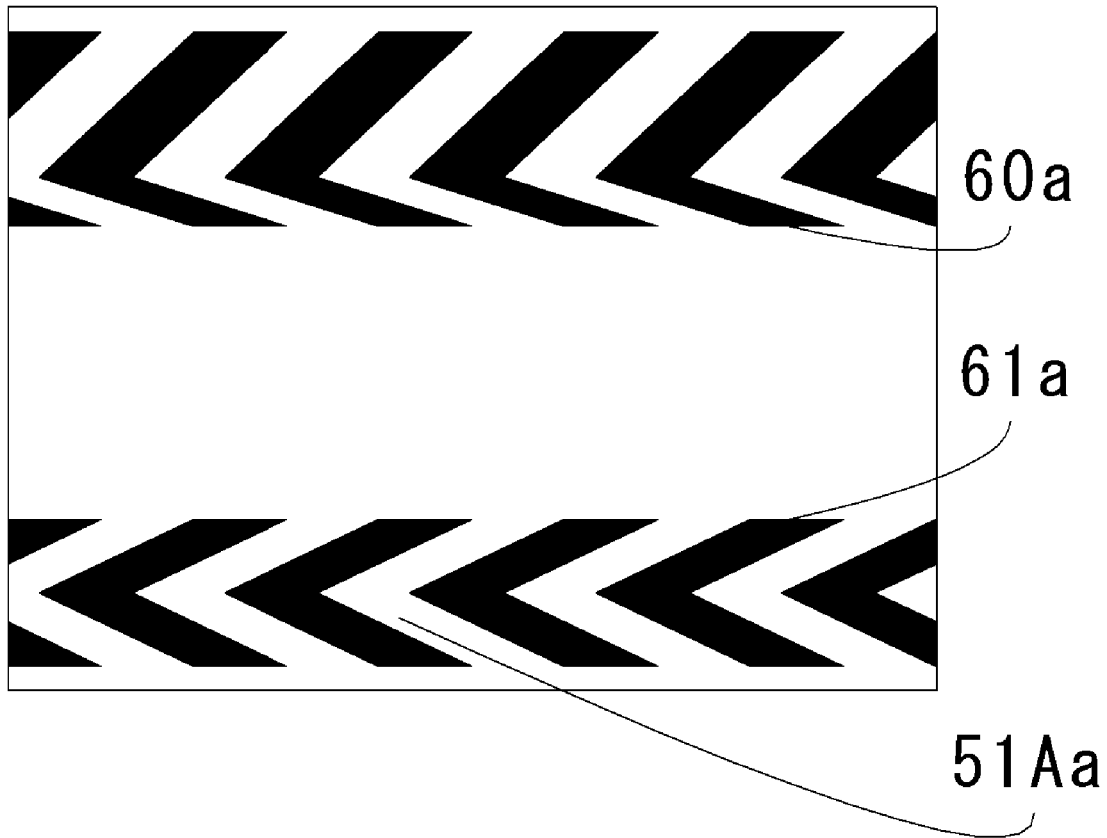
FIG. 7B is a development of the inner peripheral surface of the sleeve of the spindle motor according to the second embodiment of the invention.
Figure 7C:
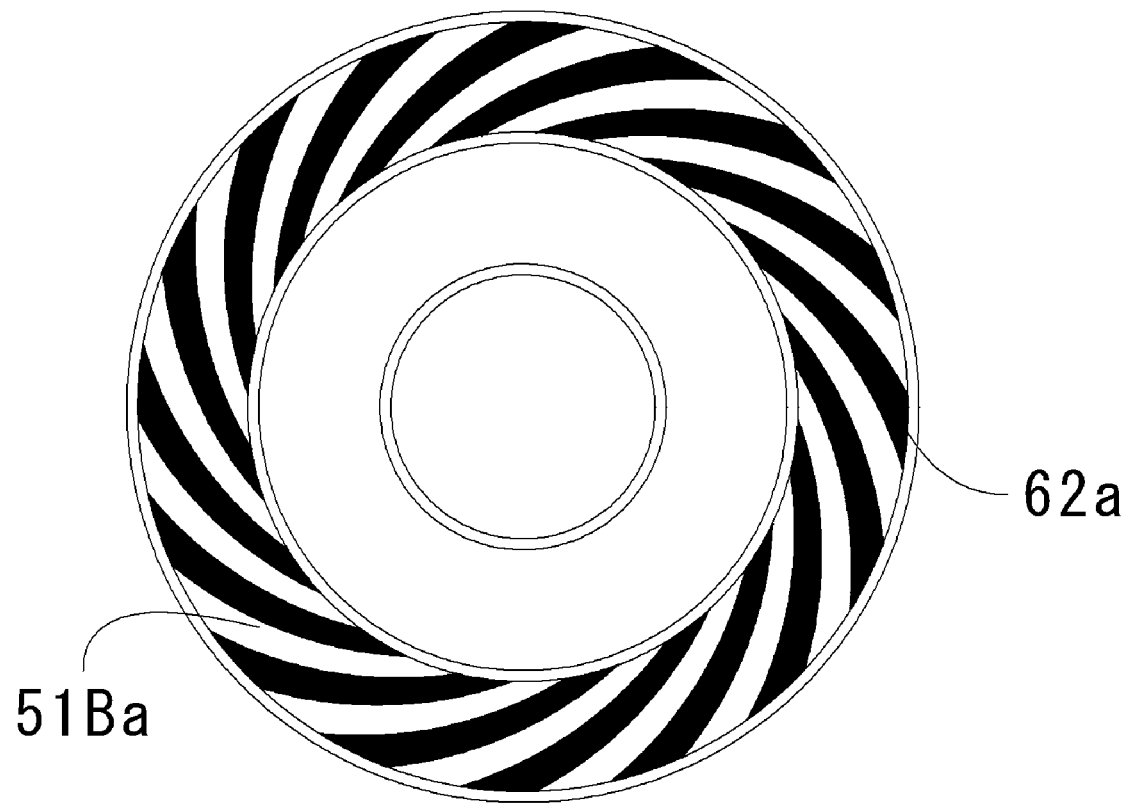
FIG. 7C is a plan view taken from the upper side of the sleeve of the spindle motor according to the second embodiment of the invention.

FIG. 7A is a sectional view of the sleeve 51 according to this embodiment, FIG. 7B is a development of the inner peripheral surface 51Aa of the sleeve 51, and FIG. 7C is a plan view taken from the upper side of the sleeve 51 including the upper end surface 51Ba of the sleeve. This embodiment has 5 radial dynamic pressure generation grooves 60a, 61a and 16 thrust dynamic pressure generation grooves 62a. The reason why these numbers of grooves are selected is explained below. In FIGS. 7A to 7C, the detailed form of the edge portion and the hatch indicating a cross section are not shown to clarify the shape of the groove pattern. The solid black portions represent the grooves which are depressed relatively to the surrounding portions.

The number of the radial dynamic pressure generation grooves 60a, 61a is determined by the inner diameter of the sleeve 51, the width and machining accuracy of the grooves, the desired magnitude of the dynamic pressure and the viscosity and density of the lubricating fluid. For the spindle motor for rotating a small-diameter recording disk of not more than 1.8 or 2.5 inch, for example, the diameter of the shaft 53 is about 2.5 to 3.0 mm, and taking the machinable width of the grooves into consideration, about 3 to 15 grooves are feasible. According to this invention having 12 poles and 9 teeth, the numbers 3, 4, 6, 9, 12 which are divisors or multiples of 12 or 9 are eliminated. Thus, the suitable number of the radial dynamic pressure generation grooves 60a, 61a is 5, 7, 8, 10, 11, 13, 14 or 15.

The number of the thrust dynamic pressure generation grooves 62 is determined by the area of the portion formed with the grooves, the width and machining accuracy of the grooves, the desired magnitude of the dynamic pressure and the viscosity and density of the lubricating fluid.

The diameter of the outer periphery of the portion of the thrust fluid dynamic bearing 62 formed with the thrust dynamic pressure generation grooves 62a is 5 to 7 mm, and taking the machinable groove width into consideration, about 3 to 25 grooves are feasible. According to this invention in which 3, 4, 6, 9, 12, 18 and 24 are eliminated, 5, 7, 8, 10, 11, 13, 14, 15, 16, 17, 19, 20, 21, 22, 23 or 25 is a suitable number of the thrust dynamic pressure generation grooves 62a. The number of the thrust dynamic pressure generation grooves 62a is often larger than the number of the radial dynamic pressure generation grooves 60a, 61a, and the number 10 or greater is especially suitable.

This second embodiment produces similar functions and effects to the first embodiment described above.

THIRD EMBODIMENT

Figure 4:
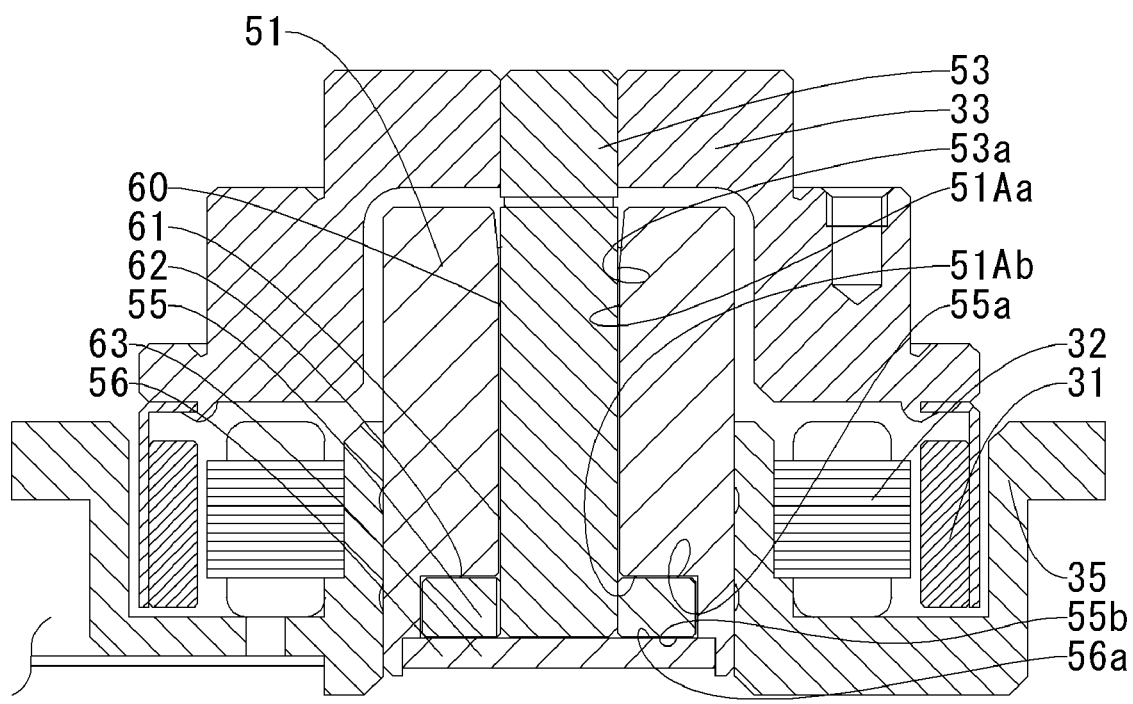
FIG. 4 is a sectional view schematically showing a spindle motor according to a third embodiment of the invention.

FIG. 4 is a sectional view schematically showing a spindle motor 203 according to a third embodiment. In this embodiment, the members having the same or similar functions as or to those of the first embodiment, even though different in form from those of the first embodiment, are designated by the same names or reference numerals, respectively.

The spindle motor 203 according to this embodiment, like the first embodiment, includes a rotor hub 33, a rotor magnet 31, a base 35, a stator 32 and a bearing mechanism 50.

The bearing mechanism 50 includes a shaft 53 erected at the rotation center of and adapted to rotate integrally with the rotor hub 33 and a sleeve 51 into which the shaft 53 is inserted. The sleeve 51 is mounted on the base 35. An annular thrust ring 55 is fitted on the lower end portion 53b of the shaft, and the lower end portion of the sleeve 251 is closed by a seal cap. The outer peripheral surface 53a of the shaft and the inner peripheral surface 51Aa of the sleeve are arranged in opposed relation to each other with a minuscule diametrical gap of, say, several to ten and several μm therebetween. The upper end surface 55a of the thrust ring and the lower surface 51Ba of the sleeve are arranged in opposed relation to each other with a minuscule axial gap of, say, several to several tens of μm therebetween. The lower end surface 55b of the thrust ring and the upper surface 56a of the seal cap are arranged in opposed relation to each other with an axial minuscule gap of, say, several to several tens of μm.

A lubricating fluid 57 is held in these diametrical and axial minuscule gaps. With the rotation of the rotary unit 3a with respect to the stationary member 3b, radial fluid dynamic bearings 60, 61 are formed by the dynamic pressure generated by the lubricating fluid 57 held in the diametrical minuscule gap. Also, thrust fluid dynamic bearings 62, 63 are formed at two points by the dynamic pressure generated by the lubricating fluid 57 held in the two axial minuscule gaps. Of these two thrust fluid dynamic bearings 62, 63, the thrust fluid dynamic bearing formed on the upper end surface 55*a* of the thrust ring is called an upper thrust fluid dynamic bearing 62, while the thrust fluid dynamic bearing formed on the lower end surface 55*b* of the thrust ring is called a lower thrust fluid dynamic bearing 63. The upper thrust fluid dynamic bearing 62 sets the rotary unit 3*a* afloat downward of the stationary member 3*b*, while the lower thrust fluid dynamic bearing 63 sets the rotary unit 3*a* afloat upward of the stationary member 3*b*. These thrust fluid dynamic bearings have substantially the same area of the dynamic pressure generating portion and substantially the same magnitude of the floating force. Therefore, no magnetic back pressure is applied.

The inner peripheral surface 51Aa of the sleeve is formed with radial dynamic pressure generation grooves 60*a*, 61*a* in the shape of herring bone. A spiral or herring bone-shaped upper thrust dynamic pressure generation grooves 62*a* is formed on the lower surface 51Ab constituting the upper thrust fluid dynamic bearing 62. Similarly, a spiral or herring bone-shaped lower thrust dynamic pressure generation grooves 63*a* is formed on the upper end surface 56*a* of the seal cap making up the lower thrust fluid dynamic bearing 63. A high dynamic pressure is generated by the pumping effect of the radial and thrust dynamic pressure generation grooves, so that the bearing rigidity of the fluid dynamic bearings is increased. The detailed specification of the dynamic pressure generation grooves is explained later.

The spindle motor 203 is a three-phase DC brushless motor. The number of the teeth 32*a* of the stator 32 is 3 or a positive integer multiple thereof. A plurality of diametrically magnetized magnetic poles 31*a* are arranged along the peripheral direction on the rotor magnet 31.

Figure 5C:
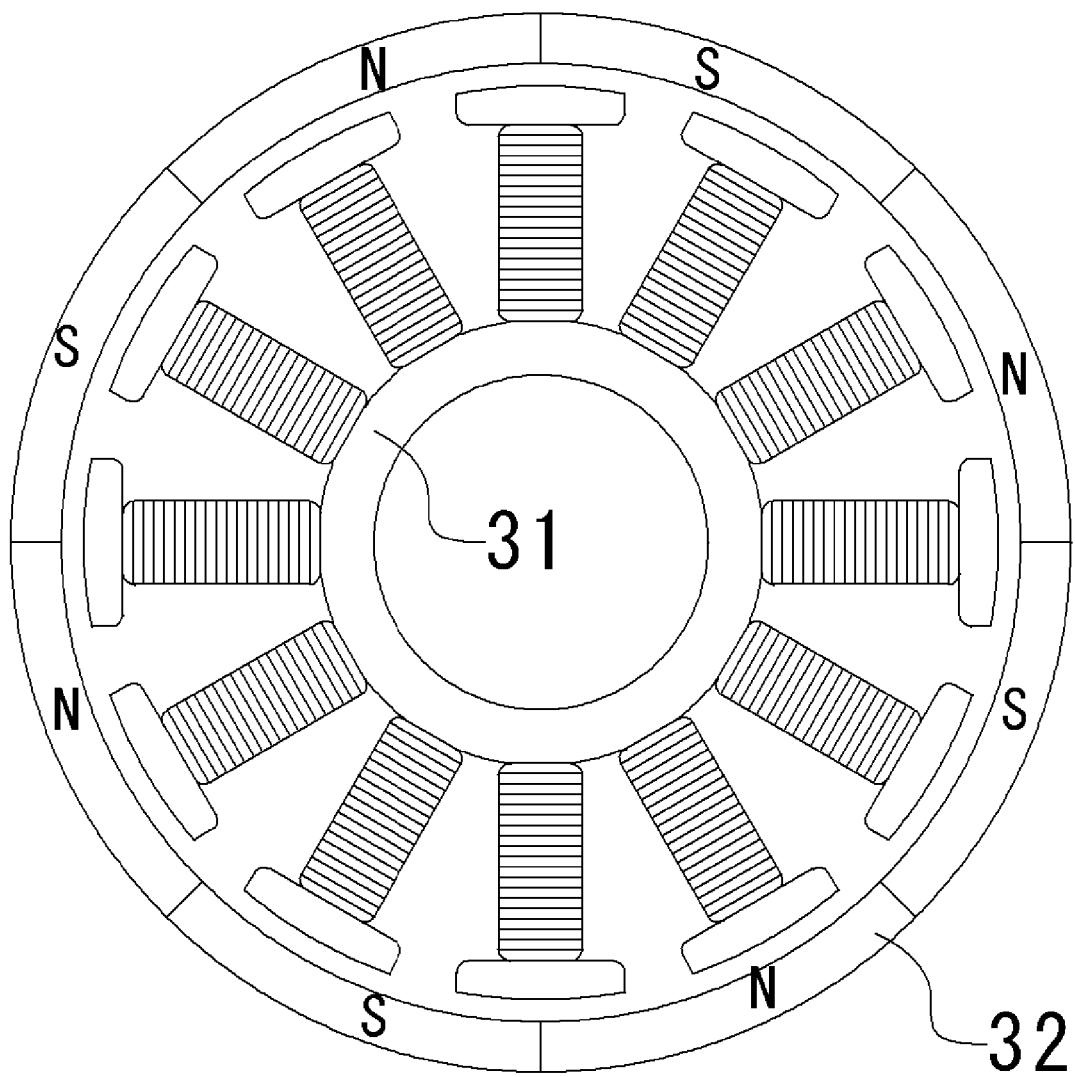
FIG. 5C is a diagram schematically showing the magnetic poles of the rotor magnet and the teeth of the stator according to the third embodiment of the invention.

FIG. 5C shows a layout of the poles 31*a* of the rotor magnet 31 and the teeth of the stator 32 of the spindle motor 203 according to this embodiment. In FIG. 5C, the rotor magnet 31 is defined into portions designated by N and S which indicate that the rotor magnet 31 is diametrically magnetized in such a manner that the N or S poles appear on the surface diametrically opposed to the stator. According to this embodiment, the rotor magnet 31 have 8 poles (magnetic poles) and the stator 32 has 12 teeth. In this case, the greatest common divisor of the number of the poles and the number of the teeth is 4 and larger than the number of drive phases of the spindle motor 203. Also, the fundamental frequency of electromagnetic vibrations is 24, i.e. the least common multiple of the number of the poles and the number of the teeth.

The motor having a larger greatest common divisor of the number of poles and the number of teeth is high in symmetry and small in the order providing a vibration source.

Figure 8A:
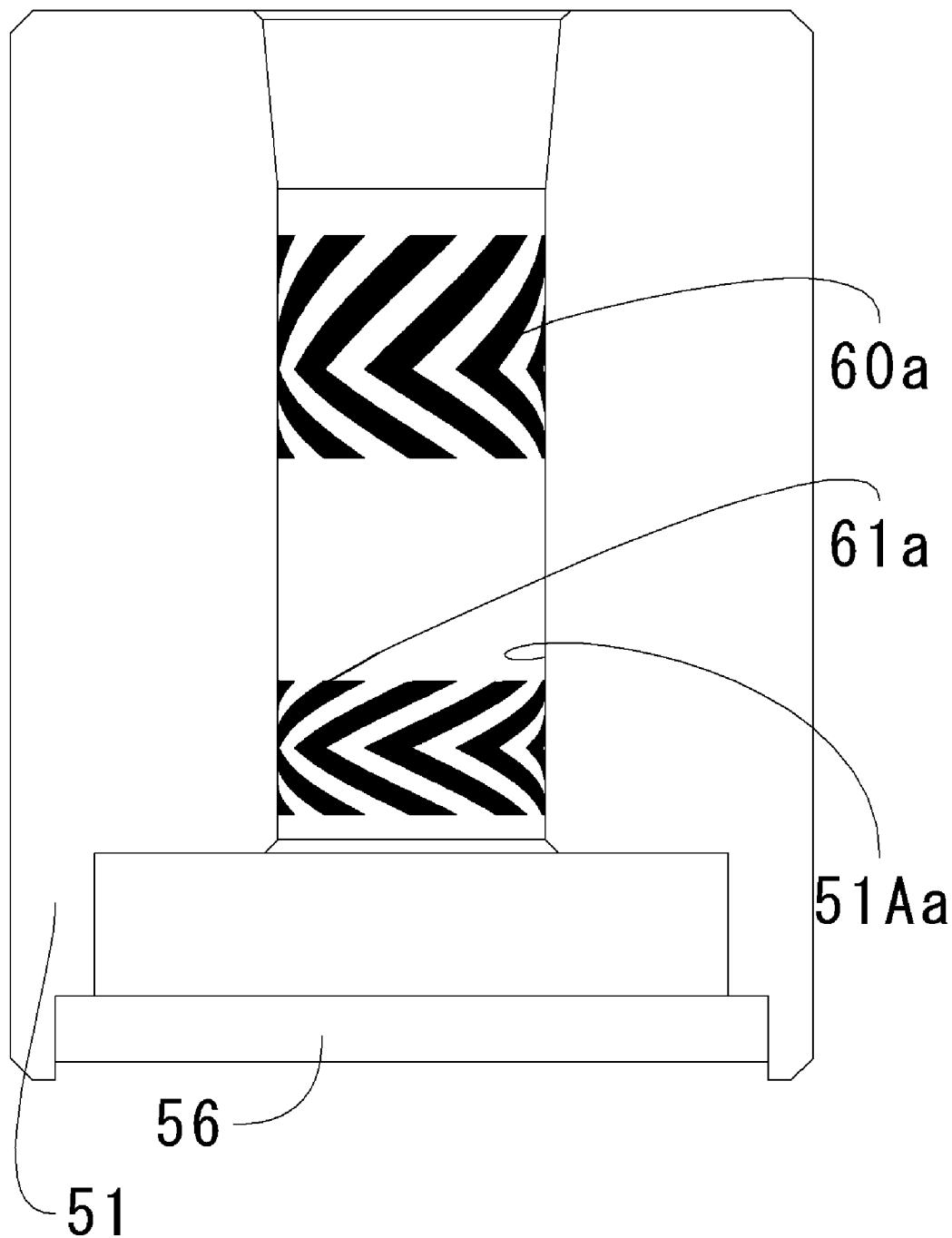
FIG. 8A is a sectional view showing the sleeve of the spindle motor according to the third embodiment of the invention.
Figure 8B:
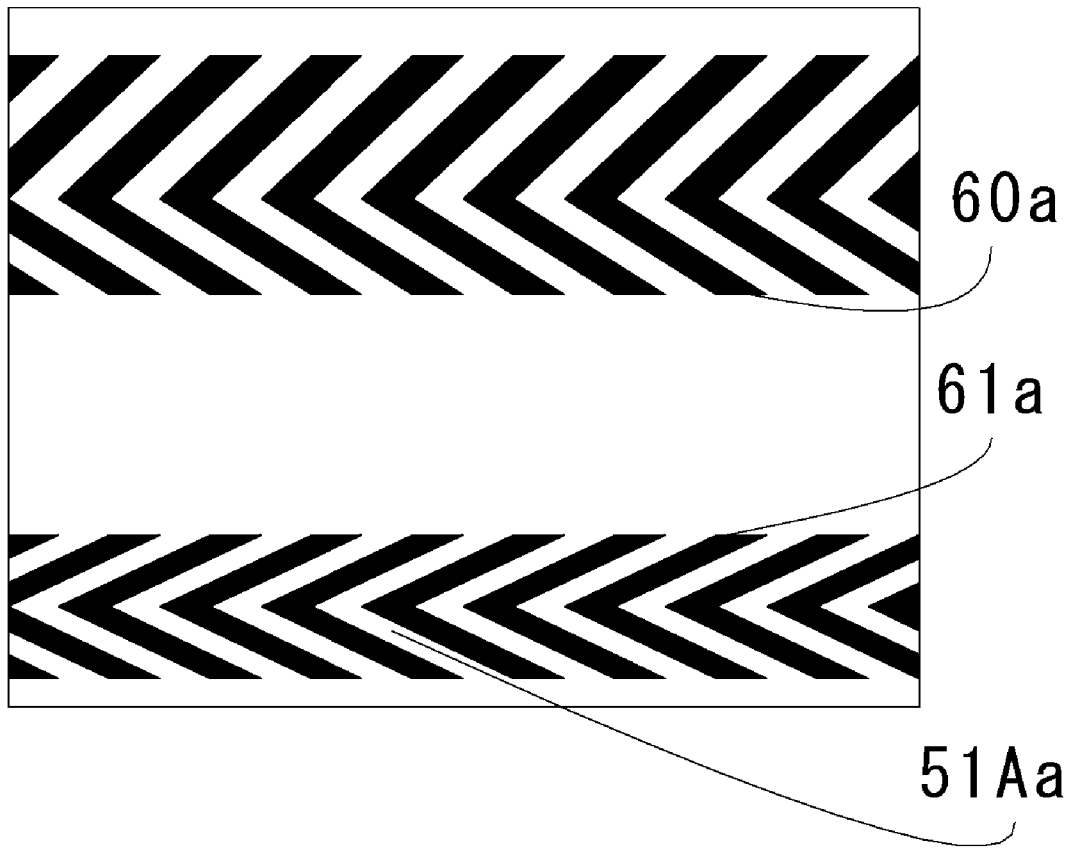
FIG. 8B is a development of the inner peripheral surface of the sleeve of the spindle motor according to the third embodiment of the invention.
Figure 8C:
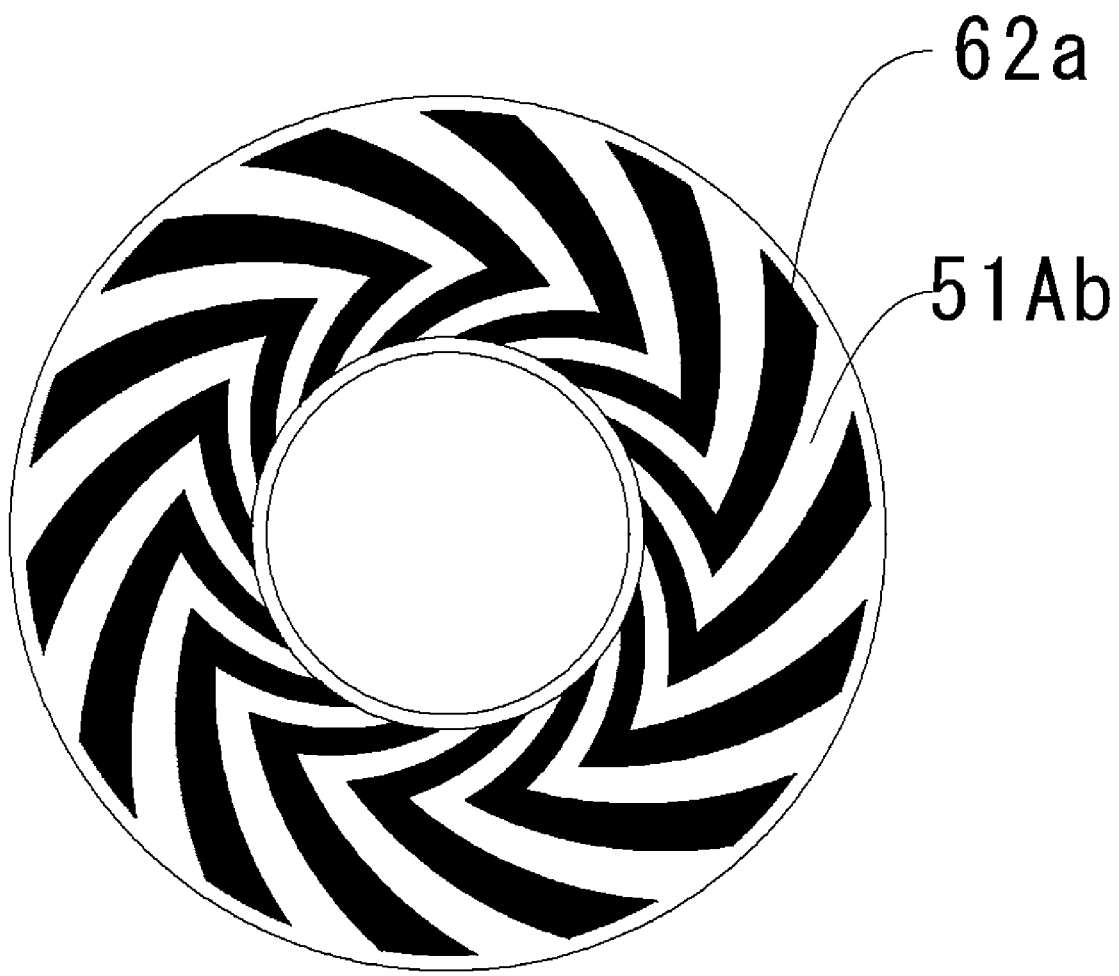
FIG. 8C is a plan view taken from the lower side of the sleeve and the spindle motor according to the third embodiment of the invention.
Figure 8D:
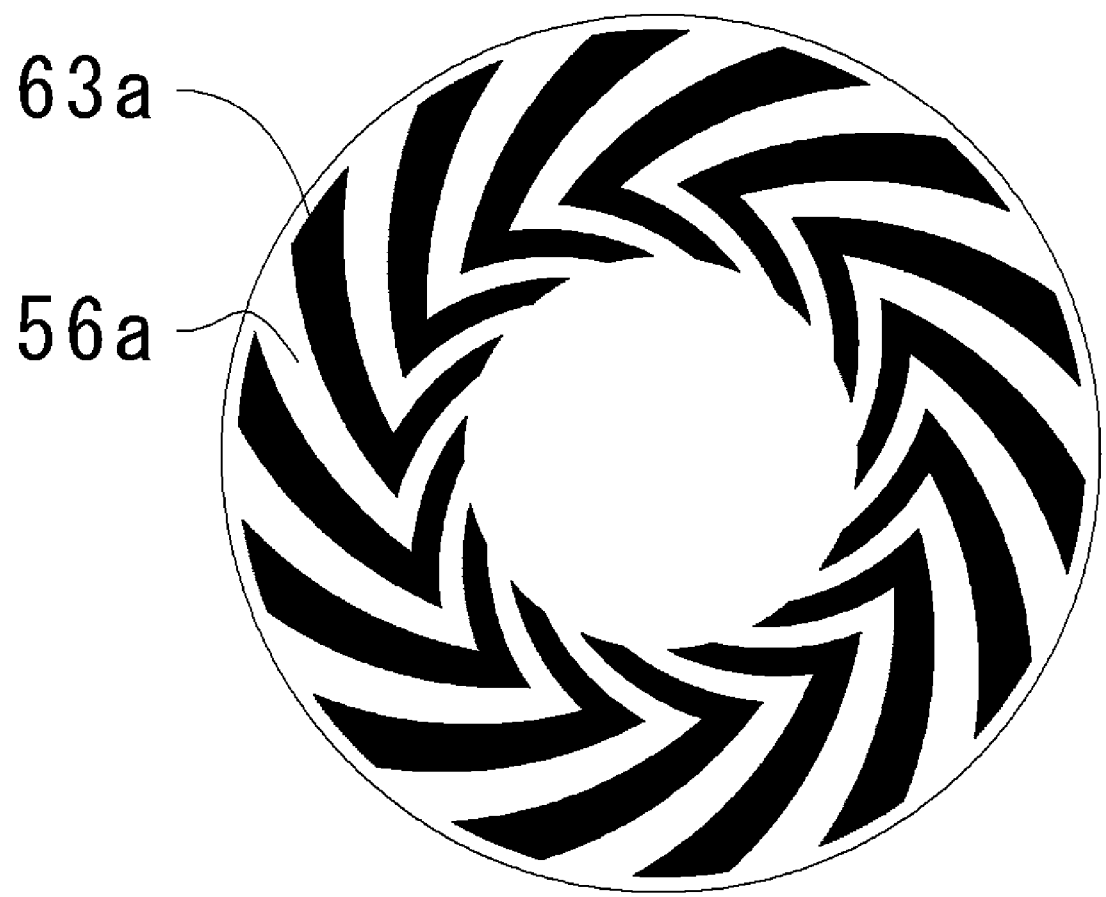
FIG. 8D is a plan view showing the upper end surface of the seal cap of the spindle motor according to the third embodiment of the invention.

FIG. 8A is a sectional view showing the sleeve 51 and the seal cap 56 according to this embodiment, FIG. 8B is a development of the inner peripheral surface 51Aa of the sleeve, FIG. 8C is a plan view taken from the lower side of the sleeve 51 including the lower surface 51Ba of the sleeve, and FIG. 8D is a plan view taken from the upper side of the seal cap 56 including the upper end surface 56*a* of the seal cap. This embodiment includes 9 radial dynamic pressure generation grooves 60*a*, 61*a* and 14 each of upper and lower thrust dynamic pressure generation grooves 62*a*, 63*a*. The reason for selecting these numbers is explained below. In FIGS. 8A to 8D, the detailed form of the edge portion and the hatch indicating a cross section are not shown to increase the clarity of the shape of the groove pattern. The solid black portions are the grooves which are depressed as relative to the surrounding portions.

The number of the radial dynamic pressure generation grooves 60, 61 is determined by the inner diameter of the sleeve 51, the width and machining accuracy of the grooves, the desired magnitude of dynamic pressure and the viscosity and density of the lubricating fluid. For the spindle motor for rotating a recording disk of 3.5 inches, for example, the diameter of the shaft 53 is about 3 to 5 mm, and taking the machinable width of the grooves into consideration, about 3 to 20 grooves are feasible. According to this invention having 8 poles and 12 teeth, the numbers 3, 4, 6, 8, 12, 16 which are divisors or multiples thereof are eliminated. Thus, the suitable number of the radial dynamic pressure generation grooves 60*a*, 61*a* is 5, 7, 9, 10, 11, 13, 14, 15, 17, 18, 19 or 20.

The number of the thrust dynamic pressure generation grooves 62*a*, 63*a* is determined by the area of the portion formed with the grooves, the width and machining accuracy of the grooves, the desired magnitude of dynamic pressure and the viscosity and density of the lubricating fluid. In each of the upper and lower thrust fluid dynamic bearings 62, 63, the diameter of the outer periphery of the portion formed with the thrust dynamic pressure generation grooves 62*a*, 63*a* is 6 to 9 mm, and taking the machinable groove width into consideration, the approximate feasible numbers are 3 to 25. According to this invention, the numbers 3, 4, 6, 8, 12, 16 and 24 are eliminated. The suitable number of the thrust dynamic pressure generation grooves 62*a*, 63*a*, therefore, is 5, 7, 9, 10, 11, 13, 14, 15, 17, 18, 19, 20, 21, 22, 23 or 25. Especially, the number of the thrust dynamic pressure generation grooves 62*a*, 63*a* is generally larger than the number of the radial dynamic pressure generation grooves 60*a*, 61 *a*, and the number not less than 10 is more suitable. By employing the same number of the grooves for the thrust fluid dynamic bearings 62*a*, 63*a* to generate substantially the same dynamic pressure in the upper and lower bearings, the stable bearing characteristic for steady rotation is easily secured.

According to the third embodiment, similar functions and effects to those of the first embodiment described above can be produced.

OTHER EMBODIMENTS

A few embodiments of the invention are explained above. The invention is not limited to these embodiments and variously modifiable without departing from the scope and spirit of the invention.

This invention is applicable also to, for example, a motor for rotating a recording disk (such as any of various removable disks, optical disk, magneto-optic disk, flexible disk, etc.) other than the hard disk. As an alternative, this invention can be used for the motor requiring a high rotation accuracy. Also, the invention is applicable to various forms of well-known fluid dynamic bearings having dynamic pressure generation grooves on the rotary or stationary side. Specifically, the invention is applicable to a configuration in which the shaft is fixed on the base, a configuration the sleeve is formed of a sintered porous material, a configuration in which the radial bearing alone is a fluid dynamic bearing while the thrust bearing is what is called a pivot bearing with solid members sliding with each other, or a configuration in which the fluid is not used as a lubricating agent (oil) but a gas, water or other fluid. Also, the radial dynamic pressure generation grooves is not necessarily spiral or in the shape of herring bone, but may be in the shape of a herring bone with a central hill, steps, multiple arcs, a vertical groove or any combination thereof. This is also the case with the thrust dynamic pressure generation grooves, which can be in the shape of a herring bone, a herring bone with a central hill, spiral, steps, multiple arcs, radial or any combination thereof. Further, according to the embodiments described above, the dynamic pressure generation grooves of the radial fluid dynamic bearing may be arranged in one line to shorten the axial length instead of in two lines in axial direction.

The motor is not limited to the three-phase motor, but may be a two-phase motor, a single-phase motor, a motor of three or more phases such as a five-phase motor. Further, the employable sets of the number of poles and the number of slots (teeth) for the three-phase motor having P poles and S slots include, in the ascending order of the number of slots, P=6, S=9 (greatest common divisor: 3); P=12, S=9 (greatest common divisor: 3); P=8, S=12 (greatest common divisor: 4); P=16, S=12 (greatest common divisor: 4); P=18, S=12 (greatest common divisor: 6); P=10, S=15 (greatest common divisor: 5); P=12, S=15 (greatest common divisor: 12); P=12, S=18 (greatest common divisor: 6); P=24, S=18 (greatest common divisor: 6); and P=14, S=21 (greatest common divisor: 7). Incidentally, in the case where one of the number of poles and the number of slots is an integer multiple of the other (for example, P=6, S=3), a dead point (where the operation cannot be started) occurs and therefore such a set should be avoided.

The number C of grooves should be selected which satisfies the relations $iP \neq C$, $P/j \neq C$, $mS \neq C$, and $S/n \neq C$ (i, j, m, n: independent and arbitrary natural numbers). In the case where thrust fluid dynamic bearing and the radial fluid dynamic bearing are formed, the effects of the invention are produced as long as the number of the dynamic pressure generation grooves formed on the surface of at least one of the bearings satisfies the relations of C described above.

Further, the number C of grooves is more preferably other than the order at which motor vibrations are generated. The order such as $iP \pm 1$ or $mS \pm 1$ (i, m: independent and arbitrary natural numbers) is liable to occur as an order of motor vibrations for a large fabrication error or assembly error of motor parts and therefore should be avoided as far as possible. According to the first and second embodiments in which the number P of poles is 12 and the number S of teeth is 9, for example, the orders to be avoided are 8, 10, 11, 13, 17, 19, 23, 25, while the numbers of grooves to be selected are 5, 7, 14, 15, 16, 20, 21, 22, 29. In the first and second embodiments, the numbers of 5, 14, 16 are selected. In the third embodiment, on the other hand, the number P of poles is 8 and the number S of teeth is 12, and therefore, the orders to be avoided are 7, 9, 11, 13, 15, 17, 23, 25, while the numbers of grooves to be selected are 5, 10, 14, 18, 19, 20, 21, 22, 26, 27, 28, 29, 30. In the third embodiment, 14 is selected as the number of the grooves of the thrust bearings, while the selected number 9 of grooves for the radial bearing corresponds to the number to be avoided. In order to secure the tough performance against the variations of mass-produced products, therefore, the number 9 of the grooves for the radial bearing is preferably avoided and 5 or 10, for example, should alternatively be safely selected. The order at which the resonance occurs can be checked by analyzing the vibrations generated with respect to the rotational speed and the frequency component of the vibrations, and it is confirmed that no problem is posed within the range of the operating conditions according to the third embodiment.

What is claimed is:

1. A motor having a fluid dynamic bearing, comprising:
   a rotary unit;
   a stationary member forming the fluid dynamic bearing with the rotary unit inserted therein for supporting the rotary unit in opposed relation thereto rotatably around a center axis through a minuscule gap therebetween;
   a rotor magnet mounted concentrically with the center axis on the rotary unit and having a plurality of magnetic poles arranged alternately along a peripheral direction thereof;
   a stator with coils wound on teeth (magnetic pole teeth) arranged radially of the center axis and mounted on the stationary member concentrically with the center axis;
   a power supply means for supplying a field drive voltage to the coils;
   a plurality of dynamic pressure generation grooves arranged equidistantly along the peripheral direction on at least one of opposed surfaces of the rotary unit and the stationary member making up the fluid dynamic bearing; and
   a lubricating fluid held in the minuscule gap, wherein
   a greatest common divisor of a number P of poles and a number S of teeth is not smaller than a number N of drive phases for energizing the coils on the one hand, and the number P of the poles, the number S of the teeth and a number C of the dynamic pressure generation grooves satisfy relations $iP \neq C$, $P/j \neq C$, $mS \neq C$, and $S/n \neq C$ on the other hand, where i, j, m, n are independent and arbitrary natural numbers.

2. The motor according to claim 1, wherein the number P of the poles, the number S of the teeth and the number C of the dynamic pressure generation grooves further satisfy relations $iP \pm 1 \neq C$ and $mS \pm 1 \neq C$.

3. The motor according to claim 2, further comprising a shaft having a cylindrical outer surface and mounted concentrically with the center axis on selected one of the rotary unit or the stationary member, a sleeve mounted concentrically with the center axis on selected one of the rotary unit or the stationary member and having an inside surface in diametrically opposed relation to the outside surface of the shaft through the minuscule gap, and C1 radial dynamic generating grooves formed on at least one of the outside surface of the shaft and the inside surface of the sleeve, the number C1 satisfying a same relation as the relation satisfied by C, wherein:
   the lubricating fluid is held in the minuscule gap between the outside surface of the shaft and the inside surface of the sleeve; and
   the dynamic pressure is generated by the lubricating fluid in the minuscule gap with the rotation of the rotary unit relative to the stationary member thereby to form a radial fluid dynamic bearing.

4. The motor according to claim 3, further comprising at least a pair of thrust surfaces formed on the rotary unit and the stationary member and opposed to each other in the center axial direction with a minuscule gap therebetween, and C2 thrust dynamic pressure generation grooves formed on at least one of the pair of the thrust surfaces, the number C2 satisfying a same relation as that satisfied by C, wherein:
   the lubricating fluid is held in the minuscule gap between the pair of the thrust surfaces; and
   the dynamic pressure is generated by the lubricating fluid in the minuscule gap with the rotation of the rotary unit relative to the stationary member thereby to form a thrust fluid dynamic bearing.

5. The motor according to claim 4, wherein:
   the thrust fluid dynamic bearing is formed in at least one place;
   selected one of the floating force generated in the thrust fluid dynamic bearing for setting the rotary unit afloat in one of the center axial directions or the floating force for setting the rotary unit afloat in the other center axial direction is unbalanced in one of the center axial directions at the time of rated rotation of the motor; and
   a magnetic back pressure is applied in the direction canceling the imbalance of the floating force.

6. The motor according to claim 5, wherein the magnetic back pressure is applied by causing the imbalance of the center axial magnetic center of the stator in one of the center axial directions with respect to the center axial magnetic center of the rotor magnet.

7. The motor according to claim 6, wherein the motor is a three-phase motor having the teeth in the number S as a multiple of 3.

8. The motor according to claim 7, wherein:
the sleeve is formed of a sintered porous metal material;
the dynamic pressure generation grooves including the radial dynamic pressure generation grooves and the thrust dynamic pressure generation grooves are formed by selected one of a pressure molding of a sintered powder and a sizing after sintering.

9. The motor according to claim 5, wherein the magnetic back pressure is applied between the rotor magnet and selected one of a ferromagnetic thrust yoke and a thrust magnet mounted on the stationary member opposed to the rotor magnet in the center axial direction.

10. The motor according to claim 9, wherein the motor is a three-phase motor having the teeth in the number S as a multiple of 3.

11. The motor according to claim 10, wherein:
the sleeve is formed of a sintered porous metal material; and
the dynamic pressure generation grooves including the radial dynamic pressure generation grooves and the thrust dynamic pressure generation grooves are formed by selected one of a pressure molding of a sintered powder and a sizing after sintering.

12. A motor having a fluid dynamic bearing, comprising:
a rotary unit;
a stationary member;
a shaft having a cylindrical outside surface mounted concentrically with a center axis on selected one of the rotary unit or the stationary member;
a sleeve mounted concentrically with the center axis on selected one of the rotor unit or the stationary member and having an inside surface in diametrically opposed relation to the outside surface of the shaft through a minuscule gap therebetween;
a rotor magnet mounted concentrically with the center axis on the rotary unit and having a plurality of magnetic poles arranged alternately along a peripheral direction thereof;
a stator with coils wound on teeth ( magnetic pole teeth) arranged radially of the center axis and mounted on the stationary member concentrically with the center axis;
a power supply means for supplying a field drive voltage to the coils;
a plurality of radial dynamic pressure generation grooves formed equidistantly along the peripheral direction on at least one of the outside surface of the shaft and the inside surface of the sleeve;
at least a pair of thrust surfaces formed on the rotary unit and the stationary member and opposed to each other in the center axis direction with a minuscule gap therebetween;
a plurality of thrust dynamic pressure generation grooves formed equidistantly along the peripheral direction on at least one of the pair of the thrust surfaces;
a lubricating fluid held in the minuscule gaps formed between the outside surface of the shaft and the inside surface of the sleeve and between the pair of the thrust surfaces; and
a radial fluid dynamic bearing and a thrust fluid dynamic bearing for supporting the rotary unit by generating the dynamic pressure in the lubricating fluid in the minuscule gaps with the rotation of the rotor unit relative to the stationary member around the center axis, wherein:
a number S of the teeth is a multiple of 3 that is a number of drive phases is N, wherein N=3 phases for energizing the coils, a greatest common divisor of a number P of poles and a number S of the teeth is not less than 3 that is the number of drive phases is N, wherein N=3 phases, and the number P of the poles, the number S of the teeth and the number C of the radial or thrust dynamic pressure generation grooves satisfy relations $iP \neq C$, $P/j \neq C$, $mS \neq C$, $S/n \neq C$, $iP \pm 1 \neq C$, and $mS \pm 1 \neq C$, where i, j, m, n are independent and arbitrary natural numbers.

13. The motor according to claim 12, wherein:
the thrust fluid dynamic bearing is formed in at least one place;
a selected one of the floating force generated in the thrust fluid dynamic bearing for setting the rotary unit afloat in one of the center axial directions or the floating force for setting the rotary unit afloat in the other center axial direction is unbalanced in one of the center axial directions at the time of rated rotation of the motor; and
the magnetic back pressure is applied to the rotor magnet in such a direction canceling the imbalance of the floating force.

14. The motor according to claim 13, wherein:
the sleeve is formed of a sintered porous metal material; and
the radial dynamic pressure generation grooves are formed by selected one of a pressure molding of a sintered powder or a sizing after sintering.

15. A recording disk drive having the motor described in claim 8, comprising:
a disk mounting surface formed on the rotary unit to mount a recording disk;
a base formed integrally with or independently of the stationary member;
a head for writing and/or reading information on the recording disk; and
a mechanism for supporting the head, wherein:
the information is recorded and/or read by rotating the recording disk by the motor.

16. A recording disk drive having the motor described in claim 11, comprising:
a disk mounting surface formed on the rotary unit to mount a recording disk;
a base formed integrally with or independently of the stationary member;
a head for writing and/or reading information on the recording disk; and
a mechanism for supporting the head, wherein:
the information is recorded and/or read by rotating the recording disk by the motor.

17. A recording disk drive having the motor described in claim 14, comprising:
a disk mounting surface formed on the rotary unit to mount a recording disk;
a base formed integrally with or independently of the stationary member;
a head for writing and/or reading information on the recording disk; and
a mechanism for supporting the head, wherein:
the information is recorded and/or read by rotating the recording disk by the motor.

* * * * *